United States Patent
Hada et al.

(10) Patent No.: US 10,062,938 B2
(45) Date of Patent: Aug. 28, 2018

(54) BATTERY MODULE AND ASSEMBLED BATTERY

(71) Applicants: PRIMEARTH EV ENERGY CO., LTD., Kosai-shi, Shizuoka (JP); TOYOTA JIDOSHA KABUSHIKI KAISHA, Toyota-shi, Aichi-ken (JP)

(72) Inventors: Yasuaki Hada, Hamamatsu (JP); Hiroki Tadauchi, Kosai (JP); Yasuhiro Otsuka, Kosai (JP); Hirotaka Watanabe, Toyota (JP)

(73) Assignees: PRIMEARTH EV ENERGY CO., LTD., Kosai-Shi (JP); TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 162 days.

(21) Appl. No.: 15/271,071

(22) Filed: Sep. 20, 2016

(65) Prior Publication Data

US 2017/0092998 A1 Mar. 30, 2017

(30) Foreign Application Priority Data

Sep. 25, 2015 (JP) ................................. 2015-187789

(51) Int. Cl.
*H01M 2/22* (2006.01)
*H01M 10/6557* (2014.01)
(Continued)

(52) U.S. Cl.
CPC ... *H01M 10/6557* (2015.04); *H01M 10/0525* (2013.01); *H01M 10/345* (2013.01);
(Continued)

(58) Field of Classification Search
CPC .......... H01M 10/6557; H01M 10/345; H01M 10/613; H01M 10/625; H01M 10/0525; H01M 2220/20
See application file for complete search history.

(56) References Cited

U.S. PATENT DOCUMENTS

| | | | |
|---|---|---|---|
| 2006/0115720 A1 | 6/2006 | Kim | |
| 2008/0124622 A1* | 5/2008 | Hamada | H01M 2/1077 429/149 |
| 2012/0070711 A1* | 3/2012 | Souki | H01M 10/6566 429/120 |

FOREIGN PATENT DOCUMENTS

| | | |
|---|---|---|
| JP | 2006-156049 A | 6/2006 |
| JP | 2006-156406 A | 6/2006 |
| JP | 2013-211197 A | 10/2013 |

OTHER PUBLICATIONS

JP Notification of Reasons for Refusal dated Aug. 1, 2017 as received in Application No. 2015-187789 (English Translation).

* cited by examiner

*Primary Examiner* — Cynthia K Walls
(74) *Attorney, Agent, or Firm* — Maschoff Brennan

(57) ABSTRACT

An assembled battery is formed by combining battery modules. Each battery module includes at least one battery cell and a rectangular box-shaped case that accommodates the at least one battery cell. The battery modules include a first battery module and a second battery module located adjacent to each other. The case of each of the first battery module and the second battery module includes an opposing side surface that is opposed to one of the first battery module and the second battery module. Each opposing side surface includes projections, which are laid out in rows, and ribs, which extend parallel to the layout direction of the projections. The ribs are smaller in height than the first projections. The ribs include connection ribs that connect the projections (Continued)

located in a predetermined range in the layout direction of the projections.

11 Claims, 6 Drawing Sheets

(51) Int. Cl.
*H01M 10/613* (2014.01)
*H01M 10/625* (2014.01)
*H01M 10/0525* (2010.01)
*H01M 10/34* (2006.01)

(52) U.S. Cl.
CPC ....... *H01M 10/613* (2015.04); *H01M 10/625* (2015.04); *H01M 2220/20* (2013.01)

BATTERY MODULE AND ASSEMBLED BATTERY

CROSS-REFERENCE TO RELATED APPLICATIONS

This application is based upon and claims the benefit of priority from prior Japanese Patent Application No. 2015-187789, filed on Sep. 25, 2015, the entire contents of which are incorporated herein by reference.

BACKGROUND ART

The present invention relates to a battery module formed by one or more rechargeable batteries and an assembled battery formed by battery modules.

Nickel-metal hydride rechargeable batteries and lithium-ion rechargeable batteries, which have high energy density, are used as conventional on-vehicle power supplies for electric cars, hybrid cars, and the like. Such a rechargeable battery is normally an assembled battery. The assembled battery is formed, for example, by combining battery modules. Each battery module includes one or more battery cells and a rectangular resin case that accommodates the battery cells.

When a battery cell is charged or discharged, the temperature of the battery cell increases. This adversely affects the properties of the battery cell. Accordingly, an increase in the temperature of the battery cells in a battery module adversely affects the properties of the assembled battery. The battery modules may be air-cooled to limit such increases in the temperature of the battery cells and sustain the properties of the assembled battery. Japanese Laid-Open Patent Publication No. 2006-156049 describes one example of a structure for cooling battery modules that form an assembled battery.

Japanese Laid-Open Patent Publication No. 2006-156049 describes a battery case for a rechargeable battery that includes an irregularity wall. The irregularity wall includes ridges and valleys that extend in a height-wise direction of the battery and are alternately arranged in a width-wise direction of the battery. Each ridge includes contact portions that contact another battery case when the battery cases are in contact with each other. Each valley includes an inner wall having a flat surface and an outer wall having a groove that extends in the battery height-wise direction. The groove has the form of an arc bulging inwardly into the battery case in a cross-sectional view taken in a direction orthogonal to the battery height-wise direction.

SUMMARY OF THE INVENTION

In the rechargeable battery of Japanese Laid-Open Patent Publication No. 2006-156049, the ridges contact the ridges of an opposing battery case and form air passages. The ridges allow for reduction in the wall thickness of the battery case without lowering the strength of the wall. A typical assembled battery is cooled when a gaseous cooling medium such as air flows through a cooling passage located between two opposing battery modules. However, when a battery module has a side surface that includes projections such as those of the rechargeable battery described above, the flow of the cooling medium slows down at a downstream side (rear) of each projection. This may adversely affect the cooling performance of the battery modules.

One aspect of the present invention is a battery module that is combined with another battery module to form an assembled battery. The battery module includes at least one battery cell and a case that accommodates the at least one battery cell. The other battery module includes a case including an opposing side surface that is opposed to the battery module when the battery module is located adjacent to the other battery module to form the assembled battery. The opposing side surface includes projections, which are laid out in rows, and ribs, which extend parallel to the layout direction of the projections and connect some of the projections in the layout direction of the projections. The ribs are smaller in height from the opposing side surface than the projections. The case of the battery module includes an opposing side surface that is opposed to the opposing side surface of the case of the other battery module when the other battery module is located adjacent to the battery module to form the assembled battery. The opposing side surface of the case of the battery module includes projections, which are laid out in rows, and ribs, which extend parallel to the layout direction of the projections. The ribs are smaller in height from the opposing side surface than the projections. When the assembled battery is formed, the projections of the battery module that are located in a predetermined range are opposed to the projections of the other battery module, the ribs of the battery module extend in a direction that is non-parallel to the direction in which the ribs of the other battery module extend, and the projections of the battery module opposed to the projections of the other battery module that are not connected by the ribs in the other battery module are connected by the ribs of the battery module.

Another aspect of the present invention is an assembled battery that includes battery modules combined to form the assembled battery. Each of the battery modules includes at least one battery cell and a rectangular box-shaped case that accommodates the at least one battery cell. The battery modules include a first battery module and a second battery module that are located adjacent to each other. The case of each of the first battery module and the second battery module includes an opposing side surface that is opposed to one of the first battery module and the second battery module. The opposing side surface of the first battery module includes first projections, which are laid out in rows on the opposing side surface, and first ribs, which extend parallel to the layout direction of the first projections to connect some of the first projections in the layout direction of the first projections. The first ribs are smaller in height from the opposing side surface than the first projections. The opposing side surface of the second battery modules includes second projections laid out in rows on the opposing side surface and second ribs that are smaller in height from the opposing side surface than the second projections. The second projections that are located in a predetermined range are opposed to the first projections. The second ribs extend parallel to the layout direction of the second projections and non-parallel to the extension direction of the first ribs. The second projections of the second battery module opposed to the first projections of the first battery module that are not connected to the first ribs are connected by the second ribs.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

First Embodiment

A first embodiment of battery modules and an assembled battery will now be described with reference to FIGS. 1 to 6.

Figure 1:
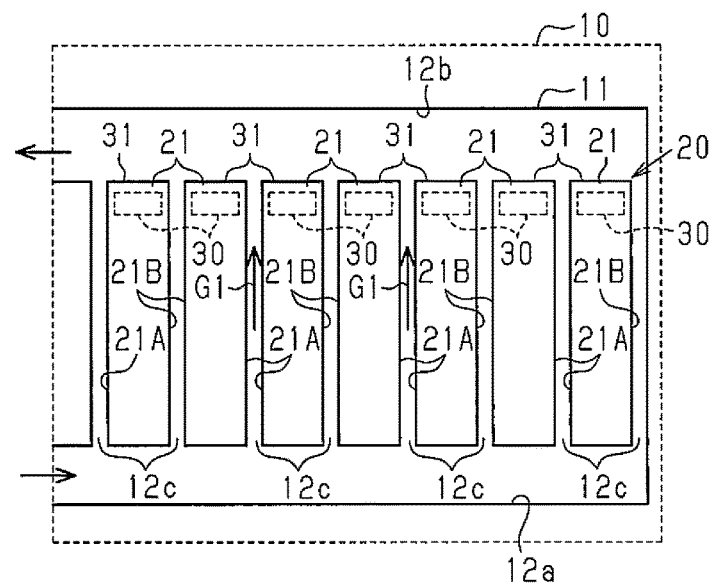
FIG. 1 is a schematic side view showing the structure of a first embodiment of battery modules and an assembled battery.

Referring to FIG. 1, a battery pack 10, which is installed in an electric car or a hybrid car, supplies power to the electric motor or the like. The battery pack 10 includes an accommodation case 11 formed from a metal material or the like. The accommodation case 11 accommodates battery modules 21, which form an assembled battery 20 that charges and discharges power, a supply passage 12a, through which a gaseous cooling medium such as air is supplied to cool the battery modules 21, and a discharge passage 12b, which discharges the cooling medium. In the description, the cooling medium is air.

Figure 2:
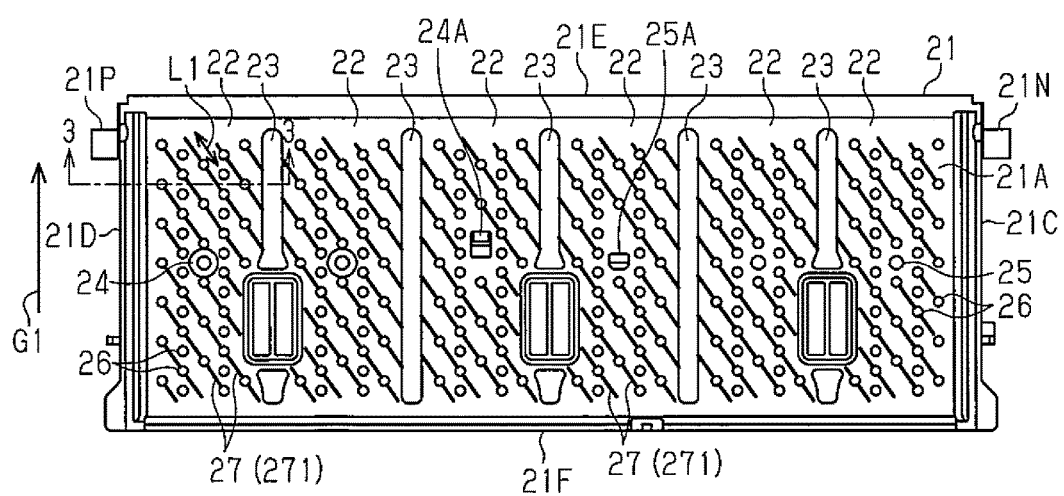
FIG. 2 is a front view showing the structure of a long side surface of one battery module in the first embodiment.

Referring to FIG. 2, each battery module 21 includes one or more battery cells 30, which are nickel-metal hydride rechargeable batteries, and a case 31, which accommodates the battery cells 30. The cases 31 of the battery modules 21 are rectangular box-shaped and have the same shape and the same size. The case 31 of each battery module 21 includes two long side surfaces 21A, 21B (refer to FIG. 1), two short side surfaces 21C, 21D, which are connected to short sides of the long side surfaces 21A, 21B, a top surface 21E, and a bottom surface 21F. The top surface 21E and the bottom surface 21F are connected to long sides of the long side surfaces 21A, 21B. In the present embodiment, the two long side surfaces 21A, 21B and the two short side surfaces 21C, 21D extend in a vertical direction so that the top surface 21E is located at an upper side and the bottom surface 21F is located at a lower side. The battery module 21 includes electrodes 21P, 21N at positions of the short side surfaces 21C, 21D toward the top surface 21E. For example, the electrode 21P is a positive electrode, and the electrode 21N is a negative electrode. In the present embodiment, when the battery module 21 is located in an upright state, the positive electrode 21P is located at the left side of the long side surface 21A, and the negative electrode 21N is located at the right side of the long side surface 21A. The long side surface 21B and the long side surface 21A are located at opposite sides of the case 31. Thus, the negative electrode 21N is located at the left side of the long side surface 21B, and the positive electrode 21P is located at the right side of the long side surface 21B.

The battery modules 21 are connected in series. As shown in FIG. 1, the battery modules 21 are, for example, reversed at the left and right sides and combined so that adjacent ones of the battery modules 21 have different polarities of the electrodes located proximate to each other. Thus, the adjacent two battery modules 21 have the long side surfaces 21A opposed to each other or the long side surfaces 21B, which are located at the opposite side, opposed to each other.

As shown in FIG. 1, the opposing long side surfaces 21A (or long side surfaces 21B) of the adjacent two battery modules 21 are spaced apart by a predetermined gap. Thus, the two long side surfaces 21A (or long side surfaces 21B) define a cooling medium passage 12c. The cooling medium passage 12c is a passage through which air, which functions as a cooling medium for cooling the battery modules 21, flows. The air flows through the cooling medium passage 12c from the lower side of the battery modules 21 to the upper side of the battery modules 21, that is, in a movement direction G1, which extends from the supply passage 12a toward the discharge passage 12b. When the air flows through the cooling medium passages 21c, heat is released to the air from the battery modules 21 through the long side surfaces 21A, 21B, which define the cooling medium passages 21c. When air flows through the cooling medium passages 12c, a direction the air flows is somewhat diffusive. However, on average, the air flows in the movement direction G1, which extends along the shortest path of the battery module 21 in the vertical direction. Additionally, when air flows to the discharge passage 12b from the supply passage 12a, a path having the lowest flow resistance (pressure loss) is normally the shortest path. This also determines that the air flows in the movement direction G1, which extends along the shortest path.

Referring to FIG. 2, each battery module 21 is formed by electrically connecting battery cells, more specifically, six battery cells (not shown), in series to obtain desired power capacity. The battery module 21 has a structure in which six separate battery cells, each of which is rectangular box-shaped and has a rectangular plane (surface) having a largest area, are arranged in one direction so that the largest-area surfaces are located next to one another. In other words, the battery module 21 includes a rectangular receptacle, which is molded from a resin, and partitions 23, which are located in the receptacle. This defines six battery receptacles 22, which accommodate the battery cells with the largest-area surfaces located next to one another. The battery module 21 is formed by respectively accommodating the battery cells in the battery receptacles 22. The long side surfaces 21A, 21B of the battery module 21 correspond to the succession of the battery cells with the largest-area surfaces located next to one another in one direction.

Though the battery module 21 includes the two long side surfaces 21A, 21B, the long side surface 21A will be mainly described for the sake of simplicity. The long side surface 21B will be described as necessary.

Figure 3:
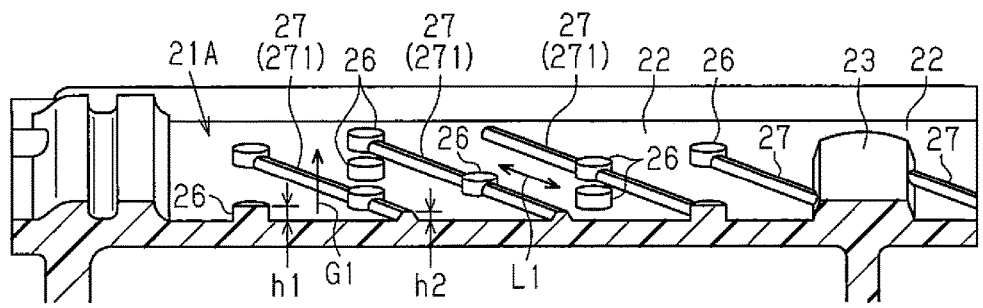
FIG. 3 is a perspective view showing the structure of a long side surface of one battery module in the first embodiment.

As shown in FIGS. 2 and 3, five partitions 23, projections 26, and ribs 27 project from the long side surface 21A of the battery module 21. The long side surface 21A also includes different kinds of positioning portions 24, 25, 24A, 25A that position an adjacent one of the battery modules 21.

The five partitions 23 and the projections 26 are arranged to oppose to the partitions 23 and the projections 26 of the long side surface 21A of the adjacent battery module 21. More specifically, the two battery modules 21 are combined so that the long side surfaces 21A of the battery modules 21 are opposed to each other. Thus, the partitions 23 and the projections 26 of one long side surface 21A partially or entirely contact the opposing partitions 23 and the opposing projections 26 of the other long side surface 21A. This limits outwardly bulging deformation of the long side surfaces 21A of the two opposing battery modules 21.

The projections 26, which project relative to the plane of the long side surface 21A of the battery module 21, are, for example, cylindrical and project from the plane. The projections 26 are in contact with the projections 26 of the adjacent battery module 21. This limits deformation of the long side surface 21A that would be outwardly bulged by gas generated in the battery module 21. The cylindrical projections 26 each include a circular top surface. Thus, when the opposing projections 26 come in contact with each other, directions do not have to be considered.

The projections 26 and the partitions 23 have the same height from the long side surface 21A. The projections 26 and the partitions 23 are arranged to be contactable with the opposing projections 26 and the opposing partitions 23. The projections 26 are regularly arranged on the long side surface 21A in rows extending in one or more directions. In the present embodiment, among the one or more directions, a predetermined extension direction L1 that intersects the movement direction G1 refers to the direction in which the projections 26 are arranged next to one another in rows. Since the projections 26 are arranged in a regular manner, one row formed by some projections 26 extends parallel to another row formed by other projections 26. Hence, the projections 26 are arranged on the long side surface 21A in rows in the extension direction L1. The movement direction G1 intersects with the extension direction L1, in which the projections 26 are arranged in rows.

The ribs 27 are arranged to connect the projections 26, which are arranged in the extension direction L1, in the extension direction L1. The ribs 27 have a height h2 from the plane of the long side surface 21A, and the projections 26 have a height h1 from the plane of the long side surface 21A. The height h2 is smaller than the height h1. The ribs 27 are arranged parallel to the extension direction L1 of the projections 26 and connect the projections 26 in the extension direction L1. The height h2 of the ribs 27 only needs to be smaller than the height h1 of the projections 26 from the long side surface 21A. However, the height preferably allows for increases in the flow speed of the cooling medium without interfering with the flow of the cooling medium (i.e., without increasing pressure loss). The height h2 of the ribs 27 is, for example, preferably 50% or greater and 90% or less of the height h1 of the projections 26, and more preferably 60% or greater and 80% or less of the height h1 of the projections 26.

The long side surface 21B of the battery module 21 also includes the projections 26 and the partitions 23 having the height h1. The projections 26 of the long side surface 21B are arranged in a direction that is symmetrical to the extension direction L1 of the long side surface 21A with respect to the movement direction G1. The long side surface 21B also includes the ribs 27 that have the height h2 from the plane of the long side surface 21B and extend to connect the projections 26. The ribs 27 of the long side surface 21B, which extend in the symmetrical direction, intersect with the ribs that extend on a long side surface of the opposing battery module 21 when the battery modules 21 are combined (connected in series) in a reversed manner and when the battery modules 21 are combined (connected in parallel) in a non-reversed manner.

Figure 4:
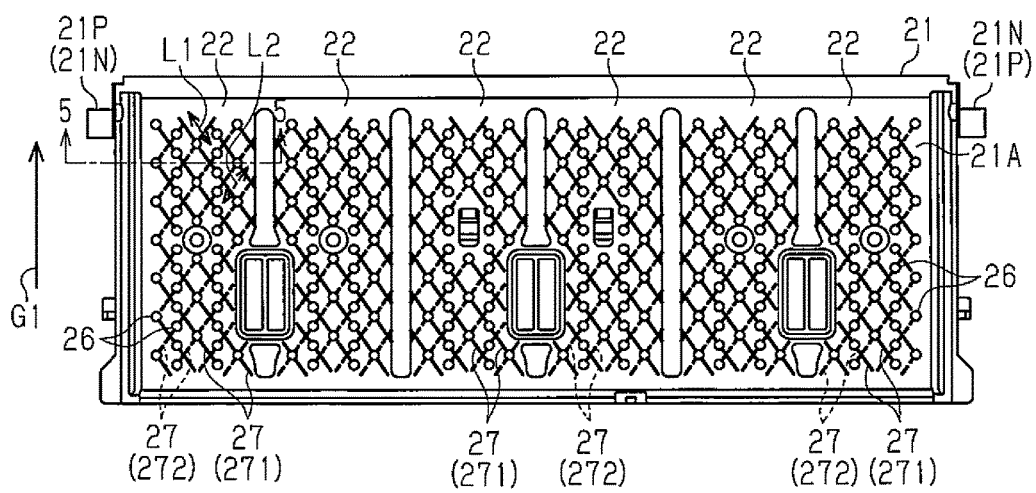
FIG. 4 is a schematic diagram showing two battery modules with the long side surfaces opposed to each other in the first embodiment.
Figure 5:
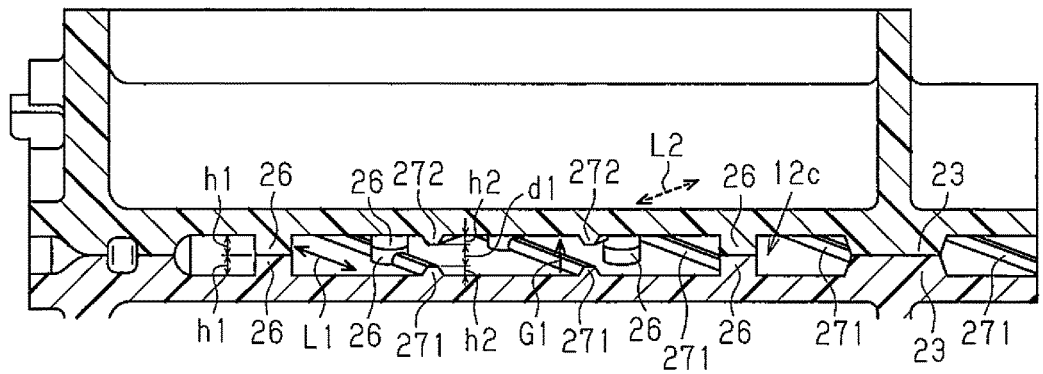
FIG. 5 is a perspective view showing the structure of two battery modules with the long side surfaces opposed to each other in the first embodiment.

Two battery modules 21 with the long side surfaces 21A opposed to each other will now be described with reference to FIGS. 4 and 5. In the description, the battery module located in the manner shown in FIGS. 2 and 3 is referred to as a first battery module 21, and another battery module that is combined with the first battery module 21 is referred to as a second battery module 21. For the sake of simplicity, the projections 26 of the first battery module 21 are referred to as first projections 26, and the projections of the second battery module 21 are referred to as second projections 26. The ribs 27 of the first battery module 21 are referred to as first ribs 271. The ribs 27 of the second battery module 21 are referred to as second ribs 272. The first ribs 271 are opposed to the second ribs 272.

When the long side surface 21A of the first battery module 21 is opposed to and combined with the long side surface 21A of the second battery module 21, the opposing partitions 23 come in contact with each other and the first projections 26 come in contact with the second projections 26. This forms the cooling medium passage 12c between the two long side surfaces 21A. Thus, the height of the cooling medium passage 12c is twice as large as the height h1 because of the first projections 26 and the second projections 26. Therefore, even when the first ribs 271 and the second ribs 272, each of which has the height h2, intersect with each other, the intersecting ribs have a gap $d1(=h1-2\times h2)$ in between. Air flows through the gap. When the direction extending from the electrode 21P toward the electrode 21N is referred to as the lateral direction, the partitions 23 and the projections 26 of the long side surface 21A of the second battery module 21 are laterally symmetrical to those of the long side surface 21A of the first battery module 21. This allows the partitions 23 and the projections 26 of the long side surface 21A of the first battery module 21 to be opposed to and in contact with the partitions 23 and the projections 26 of the long side surface 21A of the reversed second battery module 21.

The ribs 271, 272 of the first and second battery modules 21 extend in the extension direction L1, which intersects with the movement direction G1 that is parallel to the short side surfaces 21C, 21D. Thus, when the second ribs 272 of the second battery module 21 are laterally reversed and combined with the first ribs 271 of the first battery module 21, the second ribs 272 are arranged in an extension direction L2 that is symmetrical to the extension direction L1 with respect to the movement direction G1. Therefore, the extension direction L2 of the second ribs 272 intersects with both the movement direction G1 and the extension direction L1 of the first ribs 271. In a planar view of the long side surfaces 21A, the first ribs 271 intersect with the second ribs 272. This defines lattice-shaped regions between the long side surfaces 21A. The lattice-shaped regions ensure that the projections 26 separated from the ribs 27 are not isolated in the regions.

Figure 6:
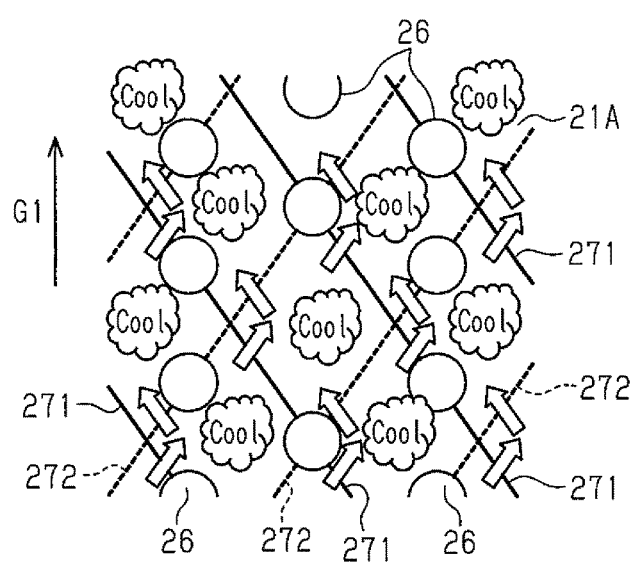
FIG. 6 is a schematic diagram showing movement of a cooling medium and a cooling effect in the first embodiment.

The cooling effect of the present embodiment will now be described with reference to FIG. 6. FIG. 6 is a schematic diagram of the cooling medium passage 12c.

The long side surface 21A of the first battery module 21 and the long side surface 21A of the second battery module 21, which define the cooling medium passage 12c, respectively include the first ribs 271 and the second ribs 272. Air flows through the cooling medium passage 12c in the movement direction G1, which is a direction extending from a lower (upstream) side to an upper (downstream) side in FIG. 6. More specifically, when the air traverses the first ribs 271 or the second ribs 272 from the upstream side to the downstream side, the air flows into the lattice-shaped regions at an increased flow speed. When flowing into the lattice-shaped regions, the air diffuses in the regions at the high flow speed and disturbs air in the lattice-shaped regions. The high flow speed increases the area of the long side surface 21A that the air contacts per unit time. This increases the cooling efficiency of the air. Additionally, the air diffuses in traveling directions. Thus, the flow does not concentrate on a central space of the cooling medium passage 12c and flows into a space proximate to the long side surfaces 21A at a high flow speed removing warm gas layers generated proximate to the long side surfaces 21A. This increases the heat exchange efficiency. More specifically, the cooling effect is enhanced in each lattice-shaped region defined by the ribs.

In the present embodiment, the projections 26 are not located inside the ribs in the regions, where the cooling effect is enhanced. The projections 26, which are formed by thickening the wall of the long side surface 21A of the battery module 21, adversely affect the heat dissipation properties and impede the cooling of heating elements in the battery module. Therefore, if the projections 26, which adversely affect the heat dissipation properties, are located inside the ribs in the regions defined, the cooling effect does not sufficiently function even when the cooling effect is enhanced in the regions. In this regard, in the present embodiment, the projections 26 are not located inside the ribs in the regions. This maintains a high level of the heat dissipation properties and produces a sufficient cooling effect.

The projections 26 may delay the air flow at the downstream side of the projections 26 and adversely affect the cooling performance. In this regard, in the present embodiment, the projections 26 are arranged on the first ribs 271 or the second ribs 272 extending in the extension directions L1, L2. In the lattice-shaped regions, the first ribs 271 and the second ribs 272 diffuse the air and send the air to the downstream (rear) side of the projections 26. This limits the adverse effect on the cooling performance. Thus, even when the projections 26 are located on the long side surface 21A, along which the air flows, a battery module that maintains a high level of the cooling performance is provided. Accordingly, an assembled battery formed by such battery modules is provided.

The battery module and the assembled battery of the present embodiment have the advantages described below.

(1) When air cooling is performed on the side surfaces of the case of the battery module 21, the flow of air or the like slows down at the downstream (rear) side of the projections. In this regard, in the above structure, the projections 26 of the first battery module 21 are opposed to the projections 26 of the second battery module 21. One of the opposing projections 26 is always connected to a rib 27. More specifically, each projection 26 is located at a position where a rib 27 exists. The rib 27 increases the flow speed of the air and sends the air to the downstream side of the projection 26. This limits the adverse effect on the cooling performance that would be caused by the projections. Additionally, there is no projection located ahead of the ribs 27 in the flow direction. This limits the adverse effect on the cooling performance that would be caused by a slow air flow at the downstream side of such a projection. Additionally, in the lattice-shaped region surrounded by the ribs, the air, which is diffused by the ribs 27, flows to locations including a location proximate to the long side surface 21A of the case swirling in various directions. This enhances the cooling performance. Consequently, even when the projections 26 are located on the long side surface 21A of the case, along which the air flows, the ribs 27 increase the flow speed of the air, and the air flow is maintained. Thus, the cooling performance is maintained at a high level. The projections 26, which are formed by thickening the wall of the long side surface 21A of the battery module 21, adversely affect the heat dissipation properties. Thus, the projections are only located at positions where the projections are connected to the ribs 27. This maintains the cooling effect in the region defined by the ribs in a further favorable manner.

The rows of the projections 26 of the first battery module 21 are non-parallel to the rows of the projections 26 of the second battery module 21. Accordingly, the ribs 27 of the first battery module 21 are non-parallel to the ribs 27 of the second battery module 21. When the long side surfaces 21A of the opposing cases are viewed in a planar direction, portions surrounded by the non-parallel ribs 27 are lattice-shaped. Since the projections 26 are located on the ribs 27, the lattice-shaped portions do not include the projections 26. Thus, the projections are not located on the side surfaces of the case corresponding to the lattice-shaped portions surrounded by the ribs 27. This maintains a high level of the cooling performance.

When the ribs 27 of the first battery module 21 are non-parallel to the ribs 27 of the second battery module 21, opposing ribs intersect with each other and form a surrounded portion not only when the battery modules are combined in a reversed manner and connected in series but also when the battery modules are combined in a non-reversed manner and connected in parallel.

(2) The long side surface 21B and the long side surface 21A are located at opposite sides of the case of the first battery module 21. The long side surface 21B also includes the projections 26, which are arranged in rows, and the ribs 27, which extend in a direction the projections are arranged. Even when another battery module is opposed to the long side surface 21B, the ribs maintain a high level of the cooling effect.

(3) The extension direction L1 of the ribs 27 of the first battery module 21 and the extension direction L2 of the ribs 27 of the second battery module 21 each intersect with the movement direction G1, in which the air flows. Thus, the air traverses the opposing ribs 27. The flow speed of the air increases when traversing each rib 27.

(4) The projections 26 are connected to the ribs 27. This tends to disturb the flow of the air around the projections 26 and limit the adverse effect on the cooling effect around the projections 26. More specifically, the cooling effect may not be adversely affected by the flow that would be slowed down by the projections.

(5) The ribs 27 also have an effect for improving the strength of the accommodation case. This allows for a thinner wall of the accommodation case and enlargement of the passage for the cooling medium. Thus, the enhancement in the cooling performance and the maintenance of the strength are both achieved.

Second Embodiment

A second embodiment of a battery module and an assembled battery will now be described with reference to FIGS. 7 to 10. The present embodiment differs from the first embodiment in that the long side surface 21A includes independent ribs 38 that are not connected to the projections 26. The description will mainly focus on the structure that differs from the first embodiment. For the sake of simplicity, the same reference characters are given to those components that are the same as the corresponding components of the first embodiment. Such components will not be described in detail.

Figure 7:
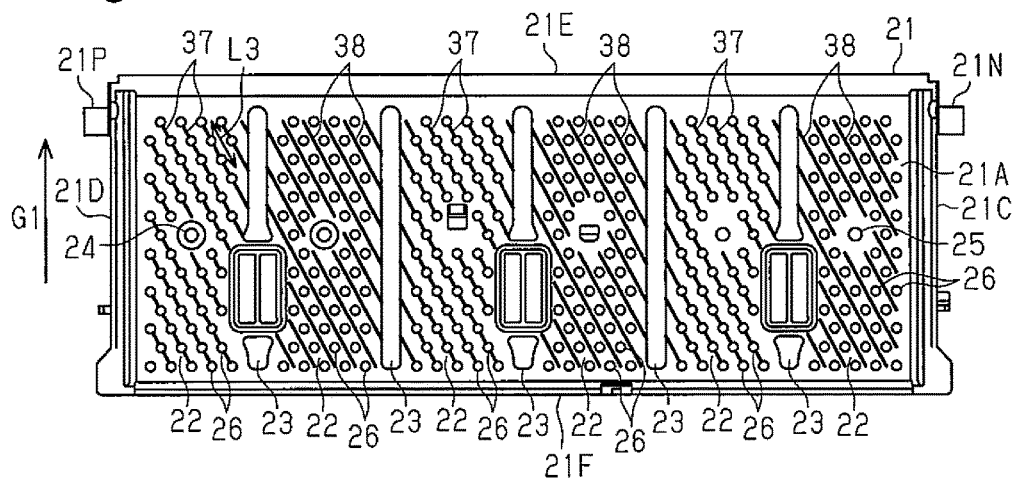
FIG. 7 is a schematic diagram showing the structure of a side surface of a second embodiment of battery modules and an assembled battery.

As shown in FIG. 7, the battery module 21 includes six battery receptacles 22. The battery receptacles 22 are arranged next to one another in the sideward direction of the long side surface 21A and accommodate battery cells. In the present embodiment, the six battery receptacles 22 are referred to as first to sixth battery receptacles 22 in order from the positive electrode 21P, which is located at the left side in FIG. 7.

As shown in FIG. 7, the projections 26, connection ribs 37, and independent ribs 38 project from the long side surface 21A of the battery module 21.

The projections 26 are cylindrical and project from the plane of the long side surface 21A of the battery module 21. The projections 26 are regularly arranged on the long side surface 21A in rows extending in one or more directions. In the present embodiment, among the one or more directions, a predetermined extension direction L3 that intersects with the movement direction G1 refers to the direction in which the projections 26 are arranged in rows located next to one another. That is, the movement direction G1 intersects with the extension direction L3, in which the projections 26 are arranged in rows located next to one another.

The connection ribs 37 are located on the surface of each of the first, third, and fifth battery receptacles 22. The connection ribs 37 are arranged to connect the projections 26, which are arranged in the extension direction L3, in the extension direction L3. In the same manner as the ribs 27 of the first embodiment, the connection ribs 37 have a height from the plane of the long side surface 21A that is smaller than the height h1 of the projections 26. The connection ribs 37 are arranged parallel to the extension direction L3 of the projections 26 and connect the projections 26 in the extension direction L3 of the projections 26. In the same manner as the ribs 27 of the first embodiment, the connection ribs 37 preferably have a height that allows for increases in the flow speed of the cooling medium without interfering with the flow of the cooling medium.

The independent ribs 38 are located on the plane of each of the second, fourth, and sixth battery receptacles 22. The independent ribs 38 are separated from the rows of the projections 26 arranged in the extension direction L3. The independent ribs 38 extend in the extension direction L3 in a manner parallel to the extension direction of the projections 26. The position separated from the rows of the projections 26 is, for example, the middle between two rows of the projections 26. However, the position may be closer to one of the rows of the projections 26 than the other row. The independent ribs 38 have a height from the plane of the long side surface 21A that is smaller than the height h1 of the projections 26. The independent ribs 38 extend in the extension direction L3 without contacting the projections 26. In the same manner as the ribs 27 of the first embodiment, the independent ribs 38 preferably have a height that allows for increases in the flow speed of the cooling medium without interfering with the flow of the cooling medium. The separate arrangement of the independent ribs 38 from the projections 26 simplifies the layout and increases the degree of formation freedom.

In the battery module 21, the connection ribs 37 and the independent ribs 38 are alternately arranged on the surfaces of the first to sixth battery receptacles 22. Thus, when the battery modules 21 are combined (connected in series) in a reversed manner, the connection ribs 37 and the independent ribs 38 form the cooling medium passage 12c. This prevents the projections 26 from being isolated in the lattice-shaped regions defined by the connection ribs 37 and the independent ribs 38.

The long side surface 21B of the battery module 21 also includes the projections 26 and the partitions 23 having the height h1. The projections 26 of the long side surface 21B are arranged in a direction that is symmetrical to the extension direction L3 of the long side surface 21A with respect to the movement direction G1. The long side surface 21B includes the negative electrode 21N located at the left side and the positive electrode 21P located at the right side as viewed from the front of the long side surface 21B. The sixth to first battery receptacles 22 are sequentially located from the left side. The first, third, and fifth battery receptacles 22 include the independent ribs 38, which are separated from the rows of the projections 26 and arranged parallel to the projections 26 in the symmetrical direction. The second, fourth, and sixth battery receptacles 22 include the connection ribs 37, which are arranged parallel to the symmetrical direction of the projections 26 and connect the projections 26 in the symmetrical direction. In the long side surface 21B, the direction in which the connection ribs 37 and the independent ribs 38 extend conforms to the symmetrical direction. Thus, the connection ribs 37 and the independent ribs 38 of the long side surface 21B intersect with ribs of an opposing long side surface when the battery modules 21 are combined (connected in series) in a reversed manner and when the battery modules 21 are combined (connected in parallel) in a non-reversed manner.

Figure 8:
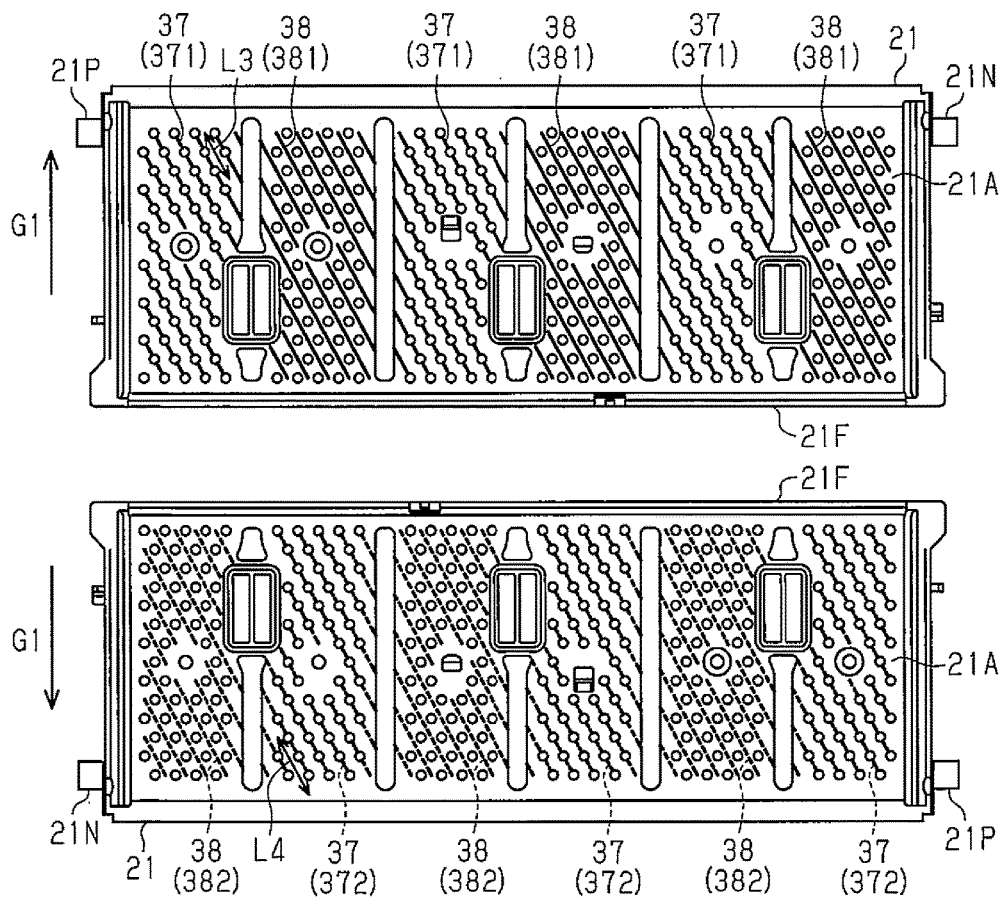
FIG. 8 is a net diagram showing the structure of two combined battery modules of the second embodiment that are separated from each other at upper and lower sides.

FIG. 8 shows two combined battery modules that are separated from each other about the axis extending in the longitudinal direction of the bottom surface 21F. The two battery modules 21 are combined with the long side surfaces 21A opposed to each other. Referring to FIG. 8, the upper battery module 21 is referred to as the first battery module 21. The lower battery module 21 is referred to as the second battery module 21. For the sake of simplicity, the connection ribs 37 and the independent ribs 38 of the first battery module 21 are referred to as first connection ribs 371 and first independent ribs 381, respectively. The connection ribs 37 and the independent ribs 38 of the second battery module 21 are referred to as second connection ribs 372 and second independent ribs 382, respectively. The first connection ribs 371 and the first independent ribs 381 are opposed to the second connection ribs 372 and the second independent ribs 382.

The first battery module 21 includes the first to sixth battery receptacles 22, which are sequentially arranged from the left side in FIG. 8. The second battery module 21 includes the sixth to first battery receptacles 22, which are sequentially arranged from the left side in FIG. 8. More specifically, the first battery receptacle 22 of the first battery module 21 is opposed to the sixth battery receptacle 22 of the second battery module 21. In the same manner, the second battery receptacle 22 of the first battery module 21 is opposed to the fifth battery receptacle 22 of the second battery module 21. The third battery receptacle 22 of the first battery module 21 is opposed to the fourth battery receptacle 22 of the second battery module 21. The fourth battery receptacle 22 of the first battery module 21 is opposed to the third battery receptacle 22 of the second battery module 21. The fifth battery receptacle 22 of the first battery module 21 is opposed to the second battery receptacle 22 of the second battery module 21. The sixth battery receptacle 22 of the first battery module 21 is opposed to the first battery receptacle 22 of the second battery module 21.

For the sake of brevity, the cooling medium passage 12c formed by the first battery receptacle 22 of the first battery module 21 and the sixth battery receptacle 22 of the second battery module 21, which are opposed to each other, will be described below. The same description is applied to the cooling medium passage 12c formed by the third battery receptacle 22 and the fourth battery receptacle 22, which are opposed to each other, and the cooling medium passage 12c formed by the fifth battery receptacle 22 and the second battery receptacle 22, which are opposed to each other. The cooling medium passage 12c formed by the second battery receptacle 22 of the first battery module 21 and the fifth battery receptacle 22 of the second battery module 21 differs from the cooling medium passage 12c formed by the first battery receptacle 22 of the first battery module 21 and the sixth battery receptacle 22 of the second battery module 21 only in that the first independent ribs 381 are included instead of the first connection ribs 371 and the second independent ribs 382 are included instead of the second connection ribs 372. Also, the cooling medium passage 12c formed by the fourth battery receptacle 22 of the first battery module 21 and the third battery receptacle 22 of the second battery module 21 and the cooling medium passage 12c formed by the sixth battery receptacle 22 of the first battery module 21 and the first battery receptacle 22 of the second battery module 21 differ in the same manner.

The connection ribs 371 (372) and the independent ribs 381 (382) of the two battery modules 21 each extend in the extension direction L3, which intersects with the movement direction G1.

Figure 9:
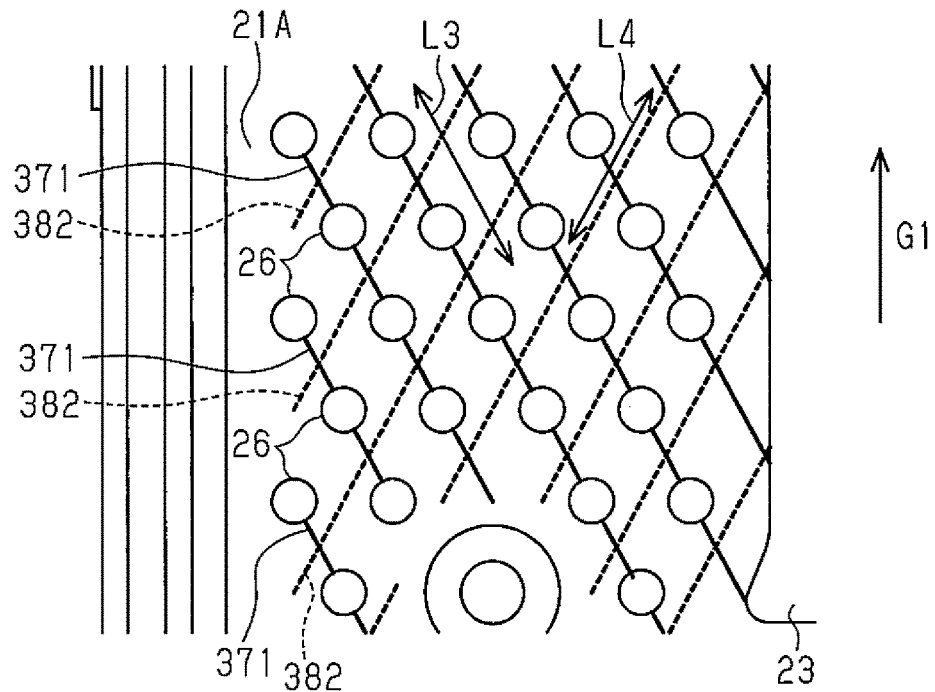
FIG. 9 is a schematic diagram showing two combined battery modules of the second embodiment with the long side surfaces opposed to each other.

Thus, as shown in FIG. 9, when the second independent ribs 382 are laterally reversed and combined with the first connection ribs 371, the second independent ribs 382 extend in an extension direction L4 that is symmetrical to the extension direction L3 with respect to the movement direction G1. Consequently, the extension direction L4 of the second independent ribs 382 intersects with both the movement direction G1 and the extension direction L3 of the first connection ribs 371. In a planar view of the long side surfaces 21A, the first connection ribs 371 intersect with the second independent ribs 382. This defines lattice-shaped regions between the long side surfaces 21A. This ensures that the projections 26 separated from the connection ribs 37 or the independent ribs 38 are not isolated in the lattice-shaped regions of the long side surfaces 21A.

Figure 10:
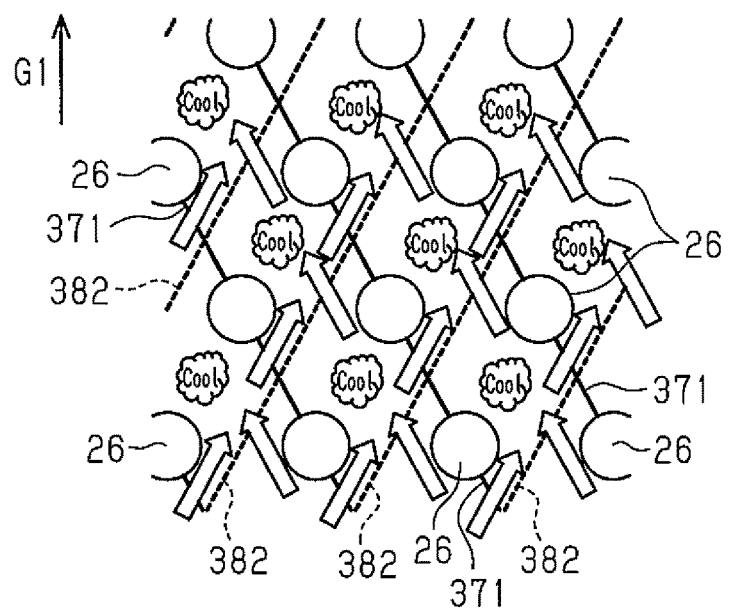
FIG. 10 is a schematic diagram showing movement of a cooling medium and a cooling effect in the second embodiment.

The cooling effect of the present embodiment will now be described with reference to FIG. 10. FIG. 10 is a schematic diagram of the cooling medium passage 12c.

The long side surface 21A of the first battery module 21 and the long side surface 21A of the second battery module 21, which define the cooling medium passage 12c, include the first connection ribs 371 and the second independent ribs 382, respectively. The air flows through the cooling medium passage 12c in the movement direction G1, which is the direction from the lower (upstream) side to the upper (downstream) side in FIG. 10. More specifically, when the air traverses the first connection ribs 371 or the second independent ribs 382 from the upstream side to the downstream side, the air flows into the lattice-shaped regions at an increased flow speed. When flowing into the lattice-shaped regions, the air diffuses in the regions at the high flow speed and disturbs air in the lattice-shaped regions. This enhances the cooling effect in each lattice-shaped region defined by the ribs.

In the present embodiment, the projections 26 are arranged in the extension direction L3 of the first connection ribs 371. Thus, when the first connection ribs 371 and the second independent ribs 382 increase the flow speed of air and diffuse the air, the projections 26 subtly decrease the flow speed and limit the diffusion. Thus, even when the projections 26 are located on the long side surface 21A, along which the air flows, a battery module that maintains a high level of the cooling performance is provided. Accordingly, an assembled battery formed by such battery modules is provided.

As described above, the battery module and the assembled battery of the present embodiment have the advantage described below in addition to advantages (1) to (3) and (5) of the first embodiment.

(6) The projections 26 are located at positions corresponding to the ribs 27 to which the projections 26 of the opposing battery module are connected. Additionally, the ribs 27 are located independently from the projections 26. Thus, the ribs 27 are easily arranged.

Other Embodiments

It should be apparent to those skilled in the art that the present invention may be embodied in many other specific forms without departing from the scope of the invention. Particularly, it should be understood that the present invention may be embodied in the following forms.

In each of the above embodiments, the ribs 27 may have any cross-sectional shape in the extension directions L1, L2, L3, L4.

Figure 11A:
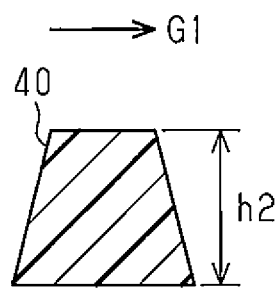
FIG. 11A is a cross-sectional view of a trapezoidal rib in another embodiment of battery modules and an assembled battery.
Figure 11B:
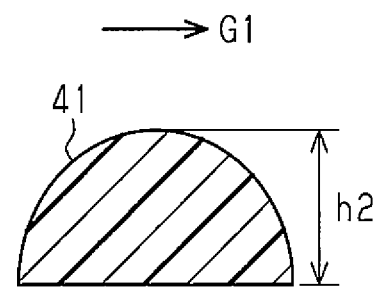
FIG. 11B is a cross-sectional view of a semicircular rib in another embodiment.
Figure 11C:
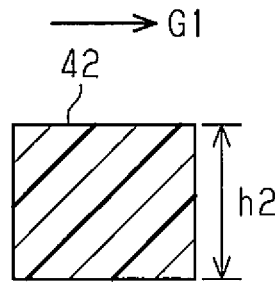
FIG. 11C is a cross-sectional view of a rectangular rib in another embodiment.
Figure 11D:
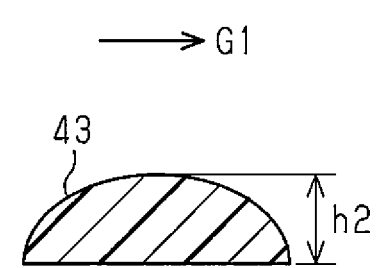
FIG. 11D is a cross-sectional view of an oblong semicircular rib in another embodiment.

As shown in FIG. 11A, the rib may be, for example, tapered to form a trapezoidal rib 40 having the height h2. As shown in FIG. 11B, the rib may be an upper semispherical rib 41 having the height h2. As shown in FIG. 11C, the rib may be a rectangular rib 42 having the height h2. As shown in FIG. 11D, the rib may be an upper semielliptical rib 43 having the height h2. The inclination of the trapezoidal rib 40 allows the air to easily traverse at the upstream side thereby reducing load (pressure loss). The inclination and changes in angle at the downstream side direct the air toward the long side surface to disturb and remove air from the long side surface. The upper semispherical rib 41 includes a curved surface that guides the air at the upstream side in the movement direction G1. The air flows along the curved surface toward the long side surface at the downstream side and removes air from the long side surface. The rectangular rib 42 disturbs the air flow at the upstream side and swiftly removes air from the long side surface at the downstream side. The upper semielliptical rib 43 includes a curved surface that further limits load applied to the flowing air at the upstream side and removes air from the long side surface at the downstream side.

In each of the above embodiments, the projections 26 are each cylindrical. However, the projections do not have to be partially or entirely cylindrical as long as each projection contacts a projection of the opposing long side surface and limits outwardly bulging deformation of the long side surface. The height-wise shape of the projection may be, for example, rectangular or trapezoidal. Alternatively, the height-wise shape of the projection may be narrow at a central position and wide at upper and lower positions. The height-wise shape of the projection may be bulged at the central position. The planar shape of the projection may be elliptical, triangular, rectangular, or polygonal having five or more sides.

In each of the above embodiments, the projections 26 are not located inside the ribs in the lattice-shaped regions. However, as long as the necessary cooling performance is maintained, projections may be located inside the ribs in some lattice-shaped regions.

Projections may be located inside the ribs in the lattice-shaped regions at the front and rear of the positioning portions 24, 25, 24A, 25A, which are larger than the projection 26 and interfere with the flow of the cooling medium, in the movement direction G1. The positioning portions 24, 25, 24A, 25A hinder the flow of the cooling medium at the above positions. Thus, the cooling performance is subtly affected. Also, projections may be located inside the ribs in the lattice-shaped regions at uppermost and lowermost portions of the battery module. The uppermost and lowermost portions are proximate to the cooling medium inlet passage or the cooling medium outlet passage and thus easily cooled compared to an intermediate portion of the battery module.

The proportion of lattice-shaped regions excluding the projections 26 isolated inside the ribs is preferably 50% or more in a predetermined range. The proportion is more preferably 70% or more and further preferably 90% or more.

In the second embodiment, the connection ribs 37 and the independent ribs 38 are alternately arranged in the first to sixth battery receptacles 22. However, the connection ribs and the independent ribs do not have to be alternately arranged as long as the cooling medium passages are formed by the connection ribs and the independent ribs when the battery modules are combined with each other in a reversed manner. For example, the connection ribs may be arranged in the first to third battery receptacles when the independent ribs are arranged in the fourth to sixth battery receptacles.

In the first embodiment, the long side surface 21B includes the ribs 27 that extend in a direction symmetrical to the extension direction L1 of the long side surface 21A with respect to the movement direction G1. Instead, long side surfaces that are located at opposite sides of the case may include ribs that extend in the same direction. Even in this case, as long as the battery modules are combined (connected in series) with each other in a reversed manner, the ribs that extend on the opposing long side surfaces intersect with each other.

In the second embodiment, the long side surface 21B includes the connection ribs 37 and the independent ribs 38 that extend in a direction symmetrical to the extension direction L3 of the long side surface 21A with respect to the movement direction G1. Instead, long side surfaces that are located at opposite sides of the case may include ribs that extend in the same direction. Even in this case, as long as the battery modules are combined (connected in series) with each other in a reversed manner, the connection ribs and the independent ribs that extend on the opposing long side surfaces intersect with each other.

In each of the above embodiments, the ribs 27 of the first battery module 21 and the ribs 27 of the second battery module 21 each intersect with the movement direction G1. Instead, the ribs 27 of one of the first battery module 21 and the second battery module 21 may extend parallel to the movement direction G1. In this case, the lattice-shaped regions do not include projections.

In each of the above embodiments, the extension direction L1 (L3) of the ribs 27 is symmetrical to the extension direction L2 (L4) of the ribs 27 with respect to the movement direction G1. However, the extension directions of the opposing ribs do not have to be symmetrical to each other with respect to the movement direction G1 as long as the extension directions intersect with each other.

In each of the above embodiments, when the battery modules 21 are combined with one another, one of two opposing battery modules 21 is reversed so that the long side surfaces 21A are opposed to each other or so that the long side surfaces 21B are opposed to each other. Instead, when the battery modules are connected in parallel or not electrically connected to one another, opposing ones of the battery modules may be combined with each other without reversing any one of the battery modules so that a long side surface of one battery module is opposed to a long side surface of the other battery module that correspond to the opposite long side surface of one battery module.

In each of the above embodiments, the cooling medium is air. Instead, the cooling medium may be gas other than air as long as the gas can be used for air cooling. Such gas may be, for example, an inert gas, a nitrogen gas, or a gas in which components of the air are changed.

In each of the above embodiments, the battery cells are nickel-metal hydride rechargeable batteries. Instead, the battery cells may be other rechargeable batteries (power storage units) such as nickel-cadmium rechargeable batteries or lithium-ion rechargeable batteries.

In each of the above embodiments, the assembled battery 20 is installed in a vehicle. The vehicle includes a gasoline-powered car or a diesel-powered car that includes a battery in addition to an electric car or a hybrid car. Further, if the battery is used as a power supply, the battery may be used as the power supply for a mobile body other than a car or as a stationary power supply. Alternatively, the battery may be used as a power supply for motors. The battery may be used as a power supply for a mobile body such as a railway vehicle, a vessel, an aircraft, or a robot or for an electric product such as an information processing device.

The present examples and embodiments are to be considered as illustrative and not restrictive, and the invention is not to be limited to the details given herein, but may be modified within the scope and equivalence of the appended claims.

The invention claimed is:

1. A battery module that is combined with another battery module to form an assembled battery, the battery module comprising:
    at least one battery cell; and
    a case that accommodates the at least one battery cell, wherein
    the other battery module includes a case including an opposing side surface that is opposed to the battery module when the battery module is located adjacent to the other battery module to form the assembled battery,
    the opposing side surface includes projections, which are laid out in rows, and ribs, which extend parallel to the layout direction of the projections and connect some of the projections in the layout direction of the projections,
    the ribs are smaller in height from the opposing side surface than the projections,
    the case of the battery module includes an opposing side surface that is opposed to the opposing side surface of the case of the other battery module when the other battery module is located adjacent to the battery module to form the assembled battery, the opposing side surface of the case of the battery module includes projections, which are laid out in rows, and ribs, which extend parallel to the layout direction of the projections, the ribs are smaller in height from the opposing side surface than the projections, and when the assembled battery is formed, the projections of the battery module that are located in a predetermined range are opposed to the projections of the other battery module, the ribs of the battery module extend in a direction that is non-parallel to the direction in which the ribs of the other battery module extend, and the projections of the battery module opposed to the projections of the other battery module that are not connected by the ribs in the other battery module are connected by the ribs of the battery module.

2. The battery module according to claim 1, wherein
the case of the battery module includes a side surface,
the side surface and the opposing side surface are located at opposite sides of the case of the battery module,
the side surface includes projections and ribs,
the projections are laid out in rows that extend non-parallel to the direction in which the ribs extend on the opposing side surface, and
the ribs of the side surface extend in the layout direction of the projections.

3. The battery module according to claim 1, wherein
the battery module and the other battery module are spaced apart by a gap,
the two opposing side surface of the battery module and the other battery module define a cooling medium passage through which a cooling medium flows, and
the extension direction of the ribs of each of the battery module and the other battery module is non-parallel to a shortest path in the cooling medium passage through which the cooling medium flows.

4. The battery module according to claim 1, wherein the ribs located on a side surface of the case of the battery module are arranged to connect the projections in the layout direction of the projections.

5. The battery module according to claim 1, wherein
the ribs include connection ribs and independent ribs,
the opposing side surface of each of the battery module and the other battery module includes a first region in which the projections are connected by the connection ribs in the layout direction of the projections and a second region in which the independent ribs are separated from the rows of the projections,
the first region of the battery module is opposed to the second region of the other battery module, and
the second region of the battery module is opposed to the first region of the other battery module.

6. An assembled battery comprising:
battery modules combined to form the assembled battery, wherein
each of the battery modules includes at least one battery cell and a rectangular box-shaped case that accommodates the at least one battery cell,
the battery modules include a first battery module and a second battery module that are located adjacent to each other, the case of each of the first battery module and the second battery module includes an opposing side surface that is opposed to one of the first battery module and the second battery module, the opposing side surface of the first battery module includes
first projections laid out in rows on the opposing side surface, and
first ribs that extend parallel to the layout direction of the first projections to connect some of the first projections in the layout direction of the first projections, wherein the first ribs are smaller in height from the opposing side surface than the first projections, the opposing side surface of the second battery modules includes
second projections laid out in rows on the opposing side surface, wherein the second projections that are located in a predetermined range are opposed to the first projections, and
second ribs that are smaller in height from the opposing side surface than the second projections, wherein the second ribs extend parallel to the layout direction of the second projections and non-parallel to the extension direction of the first ribs, and
the second projections of the second battery module opposed to the first projections of the first battery module that are not connected to the first ribs are connected by the second ribs.

7. The assembled battery according to claim 6, wherein
the first battery module and the second battery module are spaced apart by a gap,
the two opposing side surface of the first battery module and the second battery module define a cooling medium passage through which a cooling medium flows, and
the first ribs of the first battery module and the second ribs of the second battery module extend in a direction that is non-parallel to a shortest path in the cooling medium passage through which the cooling medium flows.

8. The assembled battery according to claim 6, wherein the second ribs are arranged to connect the second projections in the layout direction of the second projections.

9. The assembled battery according to claim 6, wherein
the ribs include connection ribs and independent ribs,
the opposing side surface of each of the first battery module and the second battery module includes a first region in which the projections are connected by the connection ribs in the layout direction of the projections and a second region in which the independent ribs are separated from the rows of the projections,
the first region of the first battery module is opposed to the second region of the second battery module, and
the second region of the first battery module is opposed to the first region of the second battery module.

10. The battery module according to claim 2, wherein the ribs located on a side surface of the case of the battery module are arranged to connect the projections in the layout direction of the projections.

11. The battery module according to claim 3, wherein the ribs located on a side surface of the case of the battery module are arranged to connect the projections in the layout direction of the projections.

* * * * *